US009881634B1

(12) United States Patent
Corey

(10) Patent No.: US 9,881,634 B1
(45) Date of Patent: Jan. 30, 2018

(54) MULTI-MICROPHONE SPEECH PROCESSING SYSTEM

(71) Applicant: ARM Limited, Cambridge (GB)

(72) Inventor: Ryan Michael Corey, Champaign, IL (US)

(73) Assignee: ARM Limited, Cambridge (GB)

(*) Notice: Subject to any disclaimer, the term of this patent is extended or adjusted under 35 U.S.C. 154(b) by 0 days.

(21) Appl. No.: 15/366,088

(22) Filed: Dec. 1, 2016

(51) Int. Cl.
  *G10L 15/00* (2013.01)
  *G08B 21/00* (2006.01)
  *G10L 21/028* (2013.01)
  *G10L 15/02* (2006.01)
  *G10L 15/08* (2006.01)
  *G10L 25/18* (2013.01)
  G10L 21/0216 (2013.01)

(52) U.S. Cl.
  CPC ............ *G10L 21/028* (2013.01); *G10L 15/02* (2013.01); *G10L 15/08* (2013.01); *G10L 25/18* (2013.01); *G10L 2015/088* (2013.01); *G10L 2021/02166* (2013.01)

(58) Field of Classification Search
  CPC .................................................. G10L 15/065
  USPC ........................................................ 704/251
  See application file for complete search history.

(56) References Cited

U.S. PATENT DOCUMENTS 6,047,255 A * 4/2000 Williamson ............ G10L 13/04
  704/212
6,215,408 B1 * 4/2001 Leonard ............. G01R 31/3274
  324/415
6,751,588 B1 * 6/2004 Menendez-Pidal ... G10L 15/065
  704/226
2016/0217367 A1 * 7/2016 Moreno ................. G10L 15/16
2017/0140771 A1 * 5/2017 Taniguchi ............... G10L 15/05

OTHER PUBLICATIONS

Jon Barker, Emmanuel Vincent, Ning Ma, Heidi Christensen, Phil Green. The Pascal CHiME Speech Separation and Recognition Challenge. Computer Speech and Language, Else-vier, 2013, 27 (3), pp. 621-633. <10.1016/j.csl.2012.10.004>. <hal-00743529>.
Vincent, E.; Barker, J.; Watanabe, S.; Le Roux, J.; Nesta, F.; Matassoni, M., The Second CHiME Speech Separation and Recognition Challenge: An Overview of Challenge Systems and Outcomes, IEEE Workshop on Automatic Speech Recognition & Understanding (ASRU), TR2013-119 Dec. 2013.

(Continued)

*Primary Examiner* — Paras D Shah
*Assistant Examiner* — Timothy Nguyen
(74) *Attorney, Agent, or Firm* — Leveque IP Law, P.C.

(57) ABSTRACT

An apparatus for enhancing a speech signal includes a spectral analysis circuit that generates time-frequency spectra of signals from a microphone array, a signal separation filter, and a hardware processor. The hardware processor identifies a key phrase in the signals and aligns a template of the key phrase to time-frequency spectra of a microphone in the array. A mask is generated from the aligned template and applied to the time-frequency spectra. The masked spectra are used to determine acoustic parameters that, in turn, are used to generate coefficients for configuring the source separation filter which is then used to process the spectra to generate an enhanced speech signal. The apparatus maybe used as a front end for a speech recognition engine, for example.

12 Claims, 2 Drawing Sheets

(56) References Cited

OTHER PUBLICATIONS

Jon Barker, Ricard Marxer, Emmanuel Vincent Shinji Watanabe. The third 'CHiME' Speech Separation and Recognition Challenge: Dataset, task and baselines. 2015 IEEE Automatic Speech Recognition and Understanding Workshop (ASRU 2015), Dec. 2015, Scottsdale, AZ, United States. 2015. <hal-01211376>.

Conexant, Conexant AudioSmart™ Voice + Speech Processing White Paper, WHP—203968, Feb. 2014.

Martin Cooke, John R. Hershey, and Steven J. Rennie. 2010. Monaural speech separation and recognition challenge. Comput. Speech Lang. 24, 1 (Jan. 2010), 1-15. DOI=http://dx.doi.org/10.1016/j.csl.2009.02.006.

K. Kumatani et al., "Microphone array processing for distant speech recognition: Towards real-world deployment," Proceedings of The 2012 Asia Pacific Signal and Information Processing Association Annual Summit and Conference, Hollywood, CA, 2012, pp. 1-10.

Pedersen, Michael S., et al. "A survey of convolutive blind source separation methods." Multichannel Speech Processing Handbook (2007): 1065-1084.

Rickard, Scott, and Ozgiir Yilmaz. "On the approximate W-disjoint orthogonality of speech." Acoustics, Speech, and Signal Processing (ICASSP), 2002 IEEE International Conference on. vol. 1. IEEE, 2002.

Hiroshi Sawada, Shoko Araki, and Shoji Makino, Speech Enhancement, Frequency-Domain Blind Source Separation-Chapter 2, 2005, pp. 47-79.

DeLiang Wang. On Ideal Binary Mask as the Computional Goal of Auditory Scene Analysis. On Ideal Binary Mask as the Computional Goal of Auditory Scene Analysis—Chapter 12, 2005, pp. 181-198.

Yilmaz, Ozgur, and Scott Rickard. "Blind separation of speech mixtures via time-frequency masking." IEEE Transaction on signal processing 52.7 (2004): 1830-1847.

\* cited by examiner

MULTI-MICROPHONE SPEECH PROCESSING SYSTEM

BACKGROUND

Speech and voice recognition work most reliably when input speech signals are not corrupted by background noise or interfering speech signals. Signals from multiple microphones of an array of microphones may be combined to enhance a signal from a given direction, thereby reducing noise and interference from other directions. However, the direction of the speech signal to be recognized may be unknown. In addition, in a reverberant environment, sound from any given source will arrive from many directions, making source separation very difficult.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
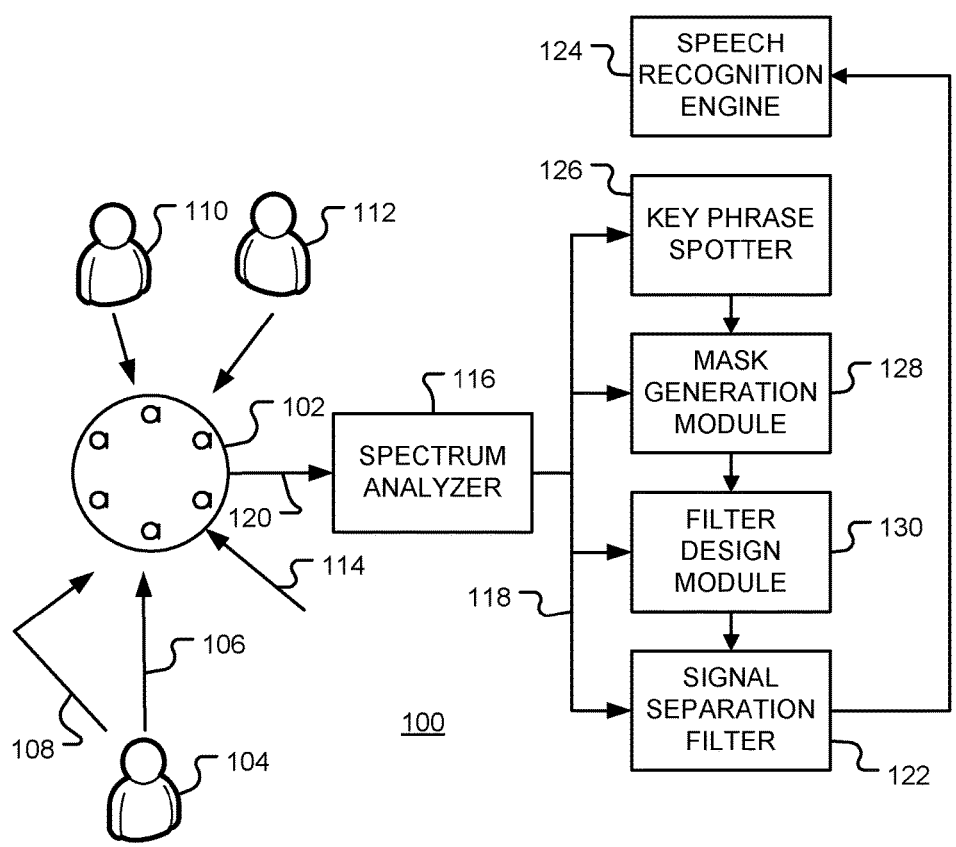
FIG. 1 is a diagrammatic representation of a system for enhancing a speech signal, consistent with certain embodiments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

The present disclosure relates to a system for enhancing speech signals. The system enables blind separation of acoustic sources and may be used, for example, to isolate a desired speech signal from other speech sounds in a noisy environment with competing talkers and significant reverberation. In one embodiment, the apparatus provides an audio front-end to a speech recognition or voice recognition engine.

The accuracy of a speech recognition engine is impaired by the mixing of the speech signal to be recognized (the desired or target signal) with interfering sound such as noise or speech from other talkers. Hence, there is a need to enhance speech signals.

FIG. 1 is a diagrammatic representation of a system 100, in accordance with embodiments of the disclosure. The system includes microphone array 102 comprising a plurality of microphones. Microphone array 102 senses speech sounds from desired speaker 104. The sound may propagate to the microphone array via a direct acoustic path 106 or via a reverberant or multiply-reflected path 108. In additional to the desired speech, microphone array 102 also senses speech from other speakers, such as speakers 110 and 112, and noise 114. These sounds are acoustically mixed. Microphone array 102 includes two or more microphones. For example, the array may have three or four microphones, between two and seven microphones, or more than seven microphones.

Spectral analysis circuit 116 generates time-frequency spectra 118 of signals 120 from microphone array 102. Spectra 118 are processed in signal separation filter 122 to produce an enhanced speech signal that may be input to a speech recognition engine 124, for example. In an alternative embodiment, signal separation filter 122 processes signals 120. The speech recognition engine is implemented on hardware processor of a local or remote device.

System 100 also includes key phrase spotter 126, mask generation module 128, and filter design module 130. These modules may be implemented on a hardware processor. The modules and the speech recognition engine may be implemented on the same hardware processor or on different hardware processors. Key phrase spotter 126 may be used to identify known speech content. The known content may be, for example, a known activating phrase. Recognition of key phrases such as "OK Google", "Hey Siri", "Cortana", "Alexa", etc. has previously been used to activate computer-implemented voice assistants. Recognition of the phrases may be achieved by comparing the sensed signals or spectra to templates. The key phrase may be several syllables long to provide sufficient data for inference of acoustic parameters.

Operation of modules 128 and 130 is described in more detailed below with reference to FIG. 2.

The characteristics of signal separation filter 122 are determined by coefficients generated via template matching and time-frequency masks. The system 100 may be used, for example, to enhance speech signals input to a speech recognition system that are activated by speaking a key phrase consisting of one or more keywords, such as those used to activate personal voice assistants. A desired speech signal is separated from background noise and other interfering speech signals after the user says a known key phrase. It is used after the key phrase has been recognized but before the rest of the spoken question or command is analyzed in order to improve the quality of the signal.

In contrast to existing methods of blind source separation, the disclosed apparatus uses a method that takes advantage of the known content of speech to provide better signal separation. The known content may be, for example, a known activating phrase. Recognition of key phrases such as "OK Google", "Hey Siri", "Cortana", "Alexa", etc. has previously been used to activate computer-implemented voice assistants. In one embodiment of the present disclosure, recognition of a key phrase is used to infer acoustic mixing parameters of the environment and to design a signal filter for separating the signals. The method does not require knowledge of the microphone configuration, the location of the speaker, or the room acoustics.

Figure 2:
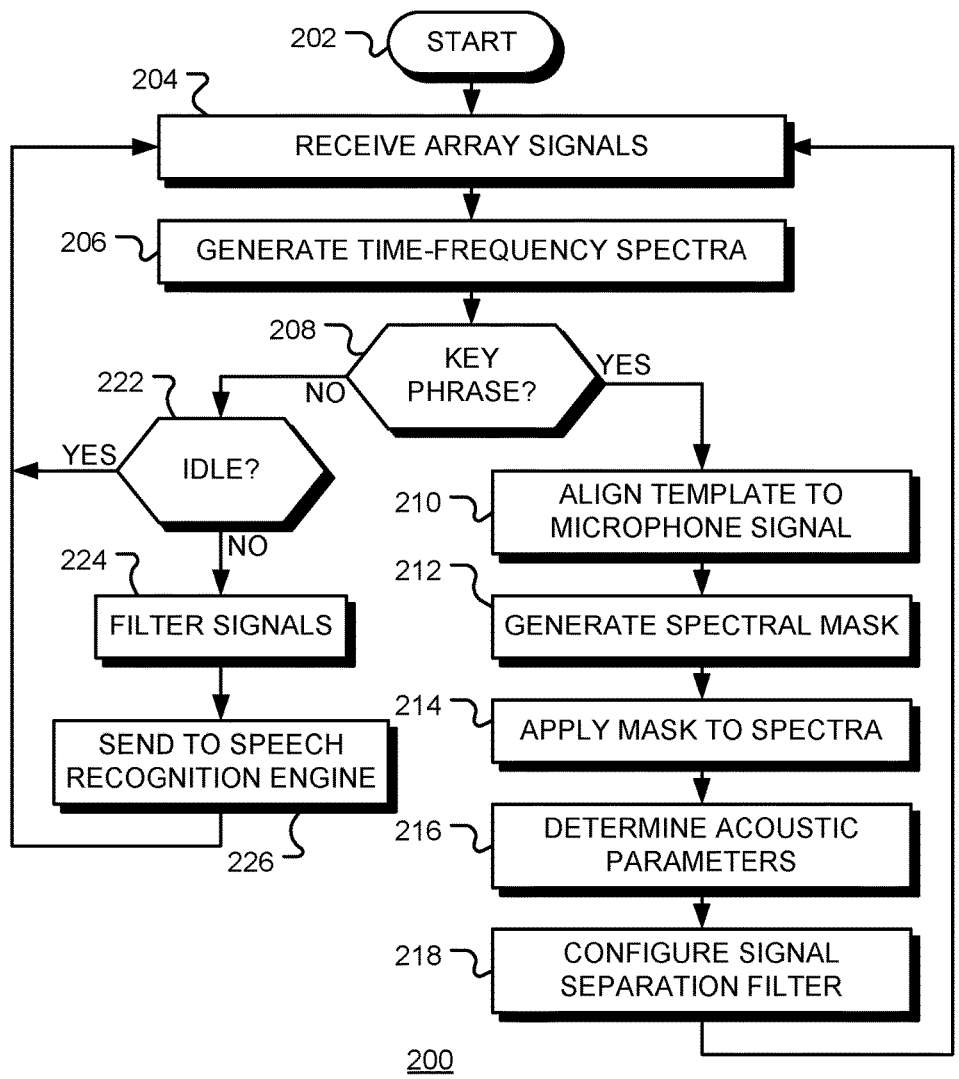
FIG. 2 is a flow chart of a method for enhancing a speech signal, consistent with certain embodiments.

FIG. 2 is a flow chart of a method for speech enhancement in accordance with embodiments of the disclosure. Following start block 202, signals are received from a microphone array at block 204. Each microphone generates a signal in response to sound at the location of the microphone. The signals may be digitized. At block 206, the signals are converted into the time-frequency spectra. This may be done by sectioning the signals into blocks and applying a short-time Fourier transform, resulting in a sequence of complex values at each of a number of frequencies for each microphone. The blocks may be overlapping and may be windowed by a selected weighting function. At decision block 208, a signal, or its corresponding sequence of spectra, is analyzed to determine if the signal was generated in response to a spoken key phrase.

If a key phrase is recognized, as depicted by the positive branch from decision block 208, a closely matching template of the key phrase is found and aligned with the microphone signal at block 210. This may be done, for example, by using dynamic time warping or hidden Markov models. The aligned template may be warped in both time and frequency. At block 212, aligned template is converted to a mask. The mask has high values where the aligned template has high energy and low values where the aligned mask has low energy. In one embodiment, the mask is a binary mask having a value "1" at times and frequencies for which the warped template has high energy or magnitude and a value "0" where it does not. At block 214, the mask is applied to the spectra of each received microphone signal. For a binary mask the time-frequency coefficients where the mask is "1" are retained and the coefficients where the mask is "0" are discarded. For a non-binary mask, the time-frequency components may be multiplied by the corresponding mask values. At block 216, the isolated key phrase samples from each microphone are compared to each other to infer acoustic parameters of the acoustic environment. The acoustic parameters may be frequency domain transfer functions, for example. For example, acoustic parameters may be found that provide the best least-squares fit to the masked data. At block 218, the acoustic parameters are used to design a source separation filter. The source separation filter may be, for example, a minimum variance distortionless response (MVDR) beamformer computed from the estimated transfer functions and sample covariance matrix. Many other beamformers that depend upon known acoustic parameters are known to those of ordinary skill in the art. Flow then returns to block 204 to receive more signals from the microphone array.

If a key phrase is not recognized, as depicted by the negative branch from decision block 208, flow continues to decision block 222. If the system is in an idle mode, such as waiting for a key phrase, flow returns to block 204 as depicted by the positive branch from decision block 222. Otherwise, as depicted by the negative branch from decision block 222, the source separation filter, if it exists, is applied to the speech at block 224 to generate an enhanced speech signal. The enhanced speech signal is passed to a speech recognition engine at block 226. Flow then returns to block 204 to receive more signals from the microphone array. An idle mode may be entered, for example, after a specified number of utterances have been processed following recognition of the key phrase.

Multi-microphone source separation relies on the spatial separation between the multiple microphones of the microphone array to separate a desired or target sound from interfering sounds. It is often applied as a pre-processing step for speech recognition. Thus, the microphones in the array are spaced such that spectra from different microphones have different phases. For example, the microphones may be several centimeters apart. The microphones may be evenly spaced or unevenly spaced. In addition, the amplitudes of the spectra may also differ due to reverberation and the different distances to the source.

In the absence of reverberation and competing talkers, simple beamforming approaches may be used. However, the system and method described above may be used in reverberant environments with interfering signals, since it enables estimation of the mixing parameters of the acoustic scene. These mixing parameters are determined by the location of the sound sources and the room acoustics. These parameters are inferred from the sensed signals themselves.

The disclosed method uses information about the language content of the speech to create the time-frequency mask that is then used to infer the acoustic parameters. Generally, speech is sparse in its time-frequency representation, so most time-frequency coefficients of a clean speech signal are close to zero. Furthermore, in speech mixtures, most coefficients are attributable to only one source. Thus, the mask generated as described above will often be mostly 0's. As a consequence, the enhanced signal will have much of the interference and noise removed.

The disclosed system and method uses information from multiple microphones to reduce noise and interference. It requires no knowledge of the placement, the acoustic characteristics or the electrical characteristics of the microphones or of the geometry or acoustics of the room. Further, it requires no knowledge of the location of the user or of the interfering sources. In addition, the disclosed system and method works in the presence of reverberation. This is particularly advantageous if the device is placed near a wall or other reflecting surface that produces so-called early reflections.

In one embodiment, a signal x(t) received at time t at microphone m of an array of M microphones may be written as:

$$x_m(t) = h_m(t) * s(t) + n_m(t), \qquad (1)$$

where s(t) is the desired signal in the absence of reverberation, $h_m(t)$ is the acoustic impulse response between the desired source and microphone m, * denotes convolution, and $n_m(t)$ is noise and other interference. The resulting complex time-frequency component of the short-time Fourier transform (STFT) at time $t_k$ and frequency $\omega$ is approximately $$X_m(\omega, t_k) = H_m(\omega) S(\omega, t_k) + N_m(\omega, t_k), \qquad (2)$$

where the frequency domain transfer function $H_m(\omega)$ is the Fourier transform of the acoustic impulse response $h_m(t)$.

The aligned (warped) template has time-frequency components $K(\omega, t_k)$. The mask has values $b(\omega, t_k)$. For a binary mask the values are either zero or one depending, for example, on where the magnitude $|K(\omega, t_k)|$ exceeds a threshold value. In a further embodiment, the mask is proportional to $|K(\omega, t_k)|^\alpha$ for some value $\alpha$.

The source spectra $S(\omega, t_k)$ are unknown. However, the masked source spectra may be approximated as the spectra of one of the microphones. For example, if it is assumed that $H_1(\omega) = 1$, the estimated masked source spectra are $$\hat{S}(\omega, t_k) b(\omega, t_k) \approx X_1(\omega, t_k) b(\omega, t_k). \qquad (3)$$

Using equation (3) in equation (2) enables the masked spectra components to be written as $$X_m(\omega, t_k) b(\omega, t_k) = \hat{H}_m(\omega) \hat{S}(\omega, t_k) b(\omega, t_k) + E_m(\omega, t_k), \qquad (4)$$

where $\hat{H}_m(\omega)$ is an estimate of the frequency domain transfer function and $E_m(\omega, t_k)$ is an error term. This equation holds for every block $t_k$ and every frequency $\omega$, and so can be used to estimate the source-microphone transfer function terms $H_m(\omega)$. For example, a least squares estimate of the transfer function for microphone m at frequency $\omega$ is $$\hat{H}_m(\omega) = \frac{\sum_k X_m(\omega, t_k) \hat{S}^*(\omega, t_k) b(\omega, t_k)}{\sum_k |\hat{S}(\omega, t_k)|^2 b(\omega, t_k)}, \qquad (5)$$

where the superposed star denotes a complex conjugate. Thus, the aligned templates $K(\omega, t_k)$ are used to determine masks $b(\omega, t_k)$, which are then be used to estimate the acoustic parameters, in this case the source-to-microphone transfer functions $\hat{H}_m(\omega)$, of the environment.

The time-frequency components from all of the microphones can be written in vector of notation as $$X(\omega, t_k) = H(\omega) S(\omega, t_k) + N(\omega, t_k). \qquad (6)$$

The vectors $H(\omega)$ at each frequency contain acoustic parameters of the environment that describe the acoustic path from the target source to the array. The statistical properties of the noise vector $N(\omega, t_k)$, such as the covariance matrix, provide additional acoustic parameters of the environment.

In some embodiments, the signal separation filter may be represented at each frequency by a vector of complex coefficients $W(\omega)$. The output from the signal separation filter, that is the enhance speech spectrum, at each frequency is $$R(\omega, t_k) = W^H(\omega) X(\omega, t_k) = \sum_m W_m^*(\omega) X_m(\omega, t_k), \qquad (7)$$

where the superposed H denotes a Hermitian transpose of the vector of complex coefficients of the signal separation filter. Thus, the enhanced output is a sum over microphones of the weighted time-frequency spectra for each microphone.

In an alternate embodiment, the frequency response values $W(\omega)$ are used to design a set of time-domain filters, which are then applied to the time-domain microphone signals.

In one embodiment, the enhanced time-frequency domain signals $R(\omega, t_k)$ may be used by a speech recognition engine, for example. In a further embodiment, an inverse short-time Fourier transform in conjunction with an overlap-add operation may be used to construct an enhanced time domain signal. The enhanced time domain signal may be passed to a loudspeaker to generate enhanced speech, stored for later playback or analysis, or transmitted to a remote system.

Numerous techniques are known in the art for designing the coefficients of the signal separation filter once the acoustic parameters are known. For example a minimum variance, distortion-less response (MVDR) or Minimum Output Error (MOE) filter constrains the filter coefficients such that $W^H H = c$ and minimizes the expected output power from the array. This design approach gives, at each frequency, $$W = c \frac{R^{-1}H}{H^H R^{-1}H},  \quad (8)$$

where $R=E[XX^H]$ is the covariance matrix of the array signal spectra. Other design approaches may be used without departing from the present disclosure.

Some of the elements discussed may be performed by a hardware processor, such as one or more programmed processors that are dynamically configured by a stored program of instructions. Alternatively or in addition, elements may be performed field programmable gate arrays (FPGA's), dedicated hardware, application specific integrated circuits (ASIC's) or the like, or combination thereof.

The microphones in the microphone are may be spaced such that sound from difference sources are mixed in different combinations at each microphone—due to varying propagation delays from different sources and varying distances from reflecting surfaces. For example, the array dimensions may range from a few centimeters to tens of centimeters. The microphones may be arranged in line, in a plane, in a three-dimensional array or any shape chosen by a designer. Knowledge of the microphone placement is not required.

The disclosed system and method may be used a variety of devices, such as personal voice assistants, vehicles, mobile phones and other mobile devices, wearable electronic devices, home automation systems, and teleconferencing, for example. However, while the disclosed system and method have been described with reference to an application as an audio front-end that provides signals to a computer-implemented voice recognition system, it will be apparent to those of ordinary skill in the art that they have other applications. One such application is enhancement of speech signals for human listening. The processing may be performed in real-time for sound reinforcement or amplification, as in the case of a hearing aid or a public address system. Alternatively, the processing may be used to enhance recorded signals or signals to be recorded, for example.

The implementations of the present disclosure, described above, are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

The present disclosure may be embodied in other specific forms without departing from its essence or fundamental characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing X includes any suitable method for causing another party such as a remote user, a remote processing resource (e.g., a server or cloud computer) or a machine to perform X. Similarly, performing steps X, Y, and Z may include any method of directing or controlling any combination of such other individuals or resources to perform steps X, Y, and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items:

1. An apparatus comprising: an array having a plurality of microphones that produce a plurality of first signals in responsive to receiving a speech signal; a spectral analysis circuit that receives the plurality of first signals and generates a plurality of time-frequency spectra therefrom; a signal separation filter that receives the plurality of first signals or the plurality of signal spectra as inputs and generates an enhanced time-domain or frequency domain speech signal as output; and a hardware processor configured to: determine, from the plurality of first signals or the plurality of signal spectra, if a key phrase is present in the speech signal and, if the key phrase is present in the speech signal: align a template of the key phrase to a first time-frequency spectrum of the plurality of time-frequency spectra; determine a mask from the aligned template of the key phrase;

apply the mask to the plurality of time-frequency spectra to provide a plurality of masked time-frequency spectra; determine acoustic parameters from the plurality of masked time-frequency spectra; and generate the coefficients of the source separation filter from the acoustic parameters; and configure the signal separation filter using the coefficients of the source separation function.

2. The apparatus of item 1, further comprising a speech recognition engine responsive to the enhanced speech signal.

3. The apparatus of item 2, where the speech recognition engine is activated when the key phrase is determined to be present in the speech signal.

4. The apparatus of item 1, where the mask is determined from the aligned template of the key phrase, the hardware processor further configured to: identify time-frequency coordinates for which spectral components of time-frequency spectrum of the aligned template of the key phrase have a magnitude greater than a threshold value; set components of mask to unity at the identified time-frequency coordinates; and set components of mask to zero at coordinates other than the identified time-frequency coordinates.

5. The apparatus of item 1, where received first signals are digitized and where the spectral analysis circuit comprises dedicated digital hardware configured to perform a sequence of short-time Fourier transforms of received first signals.

6. The apparatus of item 1, further comprising a loudspeaker operable to produce enhanced speech in response to the enhanced speech signal.

7. A method for providing an enhanced speech signal, the method comprising: sensing the speech signal at a first microphone of a microphone array to provide a first sensed signal, where in the microphone array is located in an acoustic environment; sensing the speech signal at one or more second microphones of the microphone array to provide one or more second sensed signals; generating a first time-frequency spectrum of the first sensed signal, the time-frequency spectrum comprising a sequence of short-time Fourier transforms of the first sensed signal; if a key phrase is present in the speech signal: aligning a template of the key phrase to the time-frequency spectrum of the first sensed signal; determining a time-frequency mask from the aligned template of the key phrase; generating second time-frequency spectra from the one or more second sensed signals; applying the time-frequency mask to the first time-frequency spectrum and the second time-frequency spectra; determining acoustic parameters of the acoustic environment from masked first and second time-frequency spectra; determining, from the acoustic parameters, coefficients of a signal separation filter; and configuring the signal separation filter dependent upon the coefficients; and if a key phrase is not present in the speech signal: generating third time-frequency spectra of the first sensed signal and the second sensed signals; and processing the third time-frequency spectra through the signal separation filter to provide the enhanced speech signal.

8. The method of item 7, where processing the third time-frequency spectra through the signal separation filter to provide the enhanced speech signal comprises: for each microphone of the microphone array, multiplying complex components of the associated third time-frequency spectra by corresponding coefficients of the signal separation filter to obtain a weighted time-frequency spectra for the microphone; and summing the weighted time-frequency spectra from all microphones of the microphone array.

9. The method of item 7, where the acoustic parameters of the acoustic environment comprise a frequency domain transfer function for each microphone of the microphone array.

10. The method of item 9, where the acoustic parameters further comprise a covariance matrix of noise at the microphones of the microphone array.

11. The method of item 7, where the time-frequency mask has a value 'one' for time-frequency components for which the aligned template of the key phrase has a high magnitude, and a value 'zero' for other time frequency components.

12. The method of item 7, where the coefficients of a signal separation filter are dependent upon a covariance matrix of the signals of the first and second microphones.

What is claimed is:

1. An apparatus comprising:
an array having a plurality of microphones that produce a plurality of first signals in responsive to receiving a speech signal;
a spectral analysis circuit that receives the plurality of first signals and generates a plurality of time-frequency spectra therefrom;
a signal separation filter that receives the plurality of first signals or the plurality of signal spectra as inputs and generates an enhanced time-domain or frequency domain speech signal as output; and
a hardware processor configured to:
determine, from the plurality of first signals or the plurality of signal spectra, if a key phrase is present in the speech signal and, if the key phrase is present in the speech signal:
align a template of the key phrase to a first time-frequency spectrum of the plurality of time-frequency spectra;
determine a mask from the aligned template of the key phrase;
apply the mask to the plurality of time-frequency spectra to provide a plurality of masked time-frequency spectra;
determine acoustic parameters from the plurality of masked time-frequency spectra; and
generate the coefficients of the source separation filter from the acoustic parameters; and
configure the signal separation filter using the coefficients of the source separation function.

2. The apparatus of claim 1, further comprising a speech recognition engine responsive to the enhanced speech signal.

3. The apparatus of claim 2, where the speech recognition engine is activated when the key phrase is determined to be present in the speech signal.

4. The apparatus of claim 1, where the mask is determined from the aligned template of the key phrase, the hardware processor further configured to:
identify time-frequency coordinates for which spectral components of time-frequency spectrum of the aligned template of the key phrase have a magnitude greater than a threshold value;
set components of mask to unity at the identified time-frequency coordinates; and
set components of mask to zero at coordinates other than the identified time-frequency coordinates.

5. The apparatus of claim 1, where received first signals are digitized and where the spectral analysis circuit comprises dedicated digital hardware configured to perform a sequence of short-time Fourier transforms of received first signals.

6. The apparatus of claim 1, further comprising a loudspeaker operable to produce enhanced speech in response to the enhanced speech signal.

7. A method for providing an enhanced speech signal, the method comprising:
- sensing the speech signal at a first microphone of a microphone array to provide a first sensed signal, where in the microphone array is located in an acoustic environment;
- sensing the speech signal at one or more second microphones of the microphone array to provide one or more second sensed signals;
- generating a first time-frequency spectrum of the first sensed signal, the time-frequency spectrum comprising a sequence of short-time Fourier transforms of the first sensed signal;
- if a key phrase is present in the speech signal:
- aligning a template of the key phrase to the time-frequency spectrum of the first sensed signal;
- determining a time-frequency mask from the aligned template of the key phrase;
- generating second time-frequency spectra from the one or more second sensed signals;
- applying the time-frequency mask to the first time-frequency spectrum and the second time-frequency spectra;
- determining acoustic parameters of the acoustic environment from masked first and second time-frequency spectra;
- determining, from the acoustic parameters, coefficients of a signal separation filter; and
- configuring the signal separation filter dependent upon the coefficients.

8. The method of claim 7, where processing the third time-frequency spectra through the signal separation filter to provide the enhanced speech signal comprises:
- for each microphone of the microphone array, multiplying complex components of the associated third time-frequency spectra by corresponding coefficients of the signal separation filter to obtain a weighted time-frequency spectra for the microphone; and
- summing the weighted time-frequency spectra from all microphones of the microphone array.

9. The method of claim 7, where the acoustic parameters of the acoustic environment comprise a frequency domain transfer function for each microphone of the microphone array.

10. The method of claim 9, where the acoustic parameters further comprise a covariance matrix of noise at the microphones of the microphone array.

11. The method of claim 7, where the time-frequency mask has a value 'one' for time-frequency components for which the aligned template of the key phrase has a high magnitude, and a value 'zero' for other time frequency components.

12. The method of claim 7, where the coefficients of a signal separation filter are dependent upon a covariance matrix of the signals of the first and second microphones.

\* \* \* \* \*